United States Patent
Beardsley et al.

(10) Patent No.: US 6,530,043 B1
(45) Date of Patent: Mar. 4, 2003

(54) WRITE DATA ERROR CHECKING IN A PCI BUS SYSTEM

(75) Inventors: Brent Cameron Beardsley, Tucson, AZ (US); Michael Thomas Benhase, Tucson, AZ (US); Gregg Steven Lucas, Tucson, AZ (US); Juan Antonio Yanes, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,440

(22) Filed: Mar. 9, 2000

(51) Int. Cl.$^7$ .................................................. G06F 11/08
(52) U.S. Cl. .................................... 714/52; 714/43
(58) Field of Search .............................. 714/52, 43, 56, 714/722, 807

(56) References Cited

U.S. PATENT DOCUMENTS

| | | | |
|---|---|---|---|
| 4,346,474 A | 8/1982 | Sze | 371/49 |
| 4,511,963 A | 4/1985 | Kantner | 364/200 |
| 4,573,192 A | 2/1986 | Roth et al. | 382/1 |
| 5,157,669 A | 10/1992 | Yu et al. | 371/37.7 |
| 5,379,386 A | 1/1995 | Swarts et al. | 395/325 |
| 5,630,054 A | * 5/1997 | Trang | 714/52 |
| 5,706,298 A | 1/1998 | Sandorfi | 371/53 |
| 5,908,471 A | 6/1999 | Lach et al. | 714/805 |
| 5,953,352 A | 9/1999 | Meyer | 371/68.1 |
| 5,961,660 A | 10/1999 | Capps, Jr. et al. | 714/763 |
| 6,272,651 B1 | * 8/2001 | Chin et al. | 714/43 |

* cited by examiner

Primary Examiner—Scott Baderman
(74) Attorney, Agent, or Firm—John H. Holcombe

(57) ABSTRACT

In a PCI bus system, a method and system check for errors in rite data transferred from a PCI data source across a PCI bus to the PCI bus system, the data comprising a plurality of blocks. Redundancy calculation logic receives the write data across the PCI bus, calculates a check value for each block of the data transferred across the PCI bus, and updating any previously calculated check value with the calculated check value at a storage location of a storage memory. Data path logic is coupled to the PCI bus and to the storage memory, and responds to a unique identifier of a redundancy write command sent subsequent to completion of the transfer of the write data across the PCI interface. The data path logic responds to the write command unique identifier, detecting the updated calculated check value at the storage location of the storage memory. Error check logic coupled to the data path logic determines whether the detected updated calculated check value indicates an error, and upon the detected updated calculated check value indicating an error, signals the error.

15 Claims, 3 Drawing Sheets

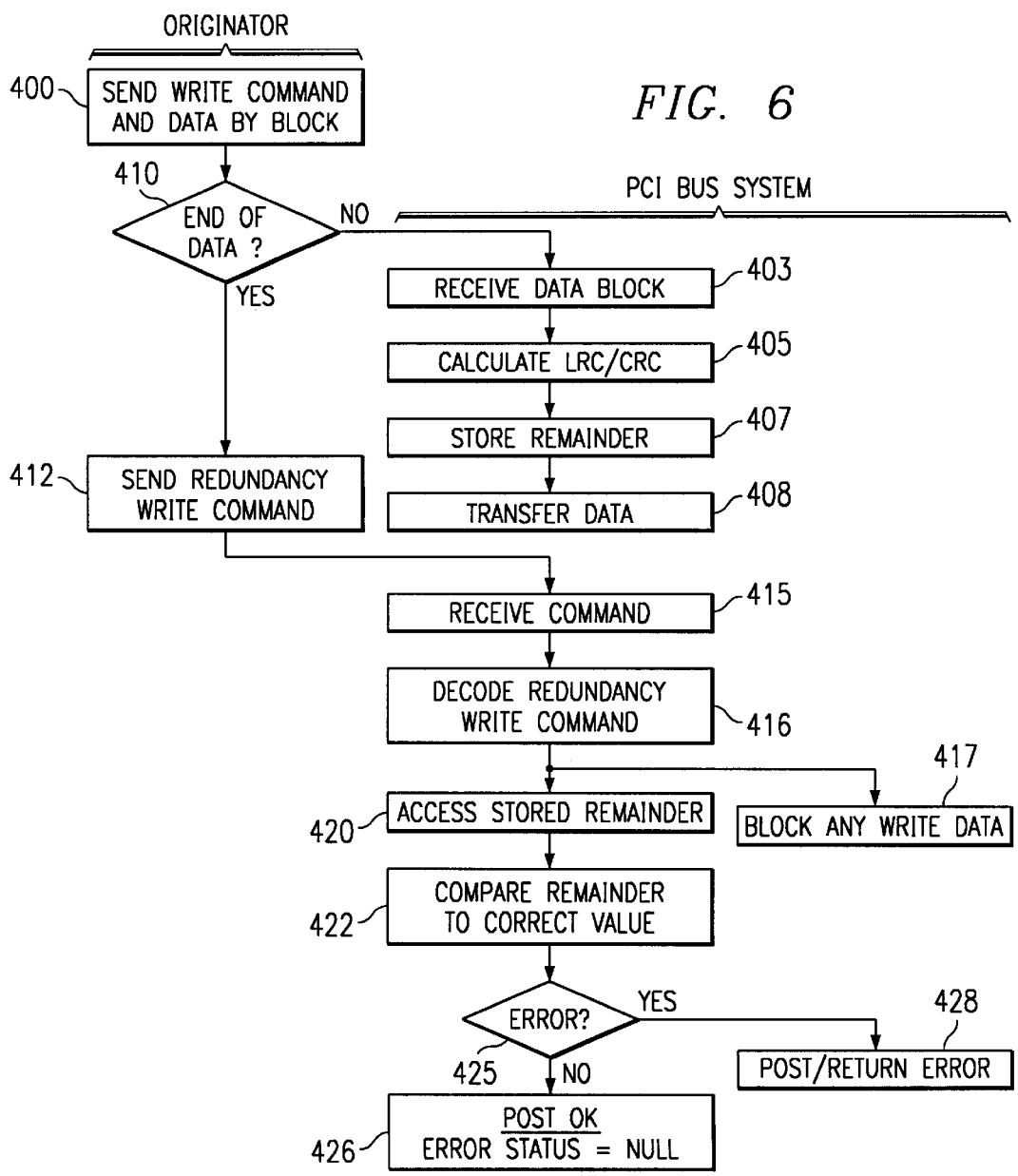

WRITE DATA ERROR CHECKING IN A PCI BUS SYSTEM

The incorporated '610 application describes an example of a complex PCI bus system for providing a connection path between a secondary PCI bus, to which are attached a plurality of agents, such as channel adapters, and at least one primary bus to which is attached a peripheral device server. The incorporated '610application additionally defines many of the terms employed herein, and such definitions are also available from publications provided by the PCI Special Interest Group, and will not be repeated here. Complex PCI bus systems, such as that of the incorporated '610 application, employ arbitration between commands from the attached channel adapters on the PCI bus system to manage the usage of the bus system in an efficient manner.

Computer data storage systems may employ PCI bus systems to provide fast data storage from hosts, such as network servers, via channel adapters and the PCI bus system, to attached storage servers having storage devices, cache storage, or non-volatile cache storage. It is advantageous to provide data storage that operates at relatively fast speeds which approach or match the speeds of the host processors, or that release the host processors, such that the host processors are not slowed. The incorporated '610 application additionally defines many of the terms employed herein, and such definitions are also available from publications provided by the PCI Special Interest Group, and will not be repeated here.

A typical requirement of any data transfer system, such as a PCI bus system, is to provide verification of write data transferred by the system. Thus, typically, write data is encoded in accordance with an error checking algorithm, such as a longitudinal redundancy check algorithm (LRC), or a cyclic redundancy check algorithm (CRC), and the resultant check character appended to the write data. The data is then checked at the other side of the PCI bus system by the same algorithm, including the check character, and, if the data is error free, the remainder of the redundancy calculation is typically an all zero output. Also typically, data transfers, including write data transfers, are conducted in a variable number of fixed sized blocks of data, such as blocks of 512 bytes of data, and the check character is appended at the end of the data. A block may alternatively comprise a single multibyte word. The error check may be conducted at the receiving device only, but will not identify the source of the error.

Thus, redundancy calculation logic has been provided as a part of many PCI bus systems in order to better isolate and identify the source of the error. Two problems result. First, the host channel adapter that originated the write data transfer will send a read command to the PCI bus system upon completion of the write data transfer and read the contents of a register which stores the calculated check value. The read must have a return path which is maintained while the read operation passes through the bus system and then the check value is returned along the path, making a read operation slow and inefficient. Second, the host channel is stalled and must remain locked to the bus, and the bus elements are held until the read command results are correctly received.

As the result, the redundancy check read operation is both slow to complete and prevents other activities at the bus.

An alternative approach is to provide hardware that sends an interrupt to the host adapter if there is a problem. The difficulty is that the hardware must know that the write data transfer from the host channel adapter is complete, and requires extensive and costly logic to identify that the transfer is completed and to respond.

SUMMARY OF THE INVENTION

It is an object of the present invention to provide a method and system for promptly determining the redundancy check value for write data completely transferred across a PCI bus.

In a PCI bus system having at least one PCI bus, at least one PCI data source, and at least one PCI data destination, a method and system are provided for checking errors in write data transferred from the PCI data source, across the PCI bus, to the PCI bus system, for the PCI data destination, the data comprising a plurality of blocks. The error checking system comprises a storage memory, and redundancy calculation logic coupled to the PCI bus and to the storage memory. The redundancy calculation logic receives the write data across the PCI bus, calculating a check value for each block of the data transferred across the PCI bus, and updating each calculated check value with any previously calculated check value at a storage location of the storage memory. Data path logic is coupled to the PCI bus and to the storage memory, and responds to a subsequently sent redundancy write command sent, e.g., from the PCI data source. The write command is highly efficient in PCI bus systems, so as to allow the PCI bus system to provide a prompt response. The subsequently sent redundancy write command has an unique identifier and provides an address which relates to the storage location of the check value, and is sent subsequent to completion of the transfer of the write data across the PCI bus.

The data path logic responds to the write command unique identifier, detecting the updated calculated check value at the storage location of the storage memory. Error check logic coupled to the data path logic determines whether the detected updated calculated check value indicates an error, and upon the detected updated calculated check value indicating an error, signaling the error.

In accordance with one embodiment of the present invention, the subsequently sent redundancy write command unique identifier comprises at least one bit of a PCI address of the write command. The bit is outside the range of addresses employed for decoding the address of the target.

For a fuller understanding of the present invention, reference should be made to the following detailed description taken in conjunction with the accompanying drawings.

BRIEF DESCRIPTION OF THE DRAWINGS

FIG. 5 is a block diagram of an embodiment of a transaction control of FIG. 2 arranged in accordance with the present invention; and FIG. 6 is a flow chart depicting an embodiment of the method of the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
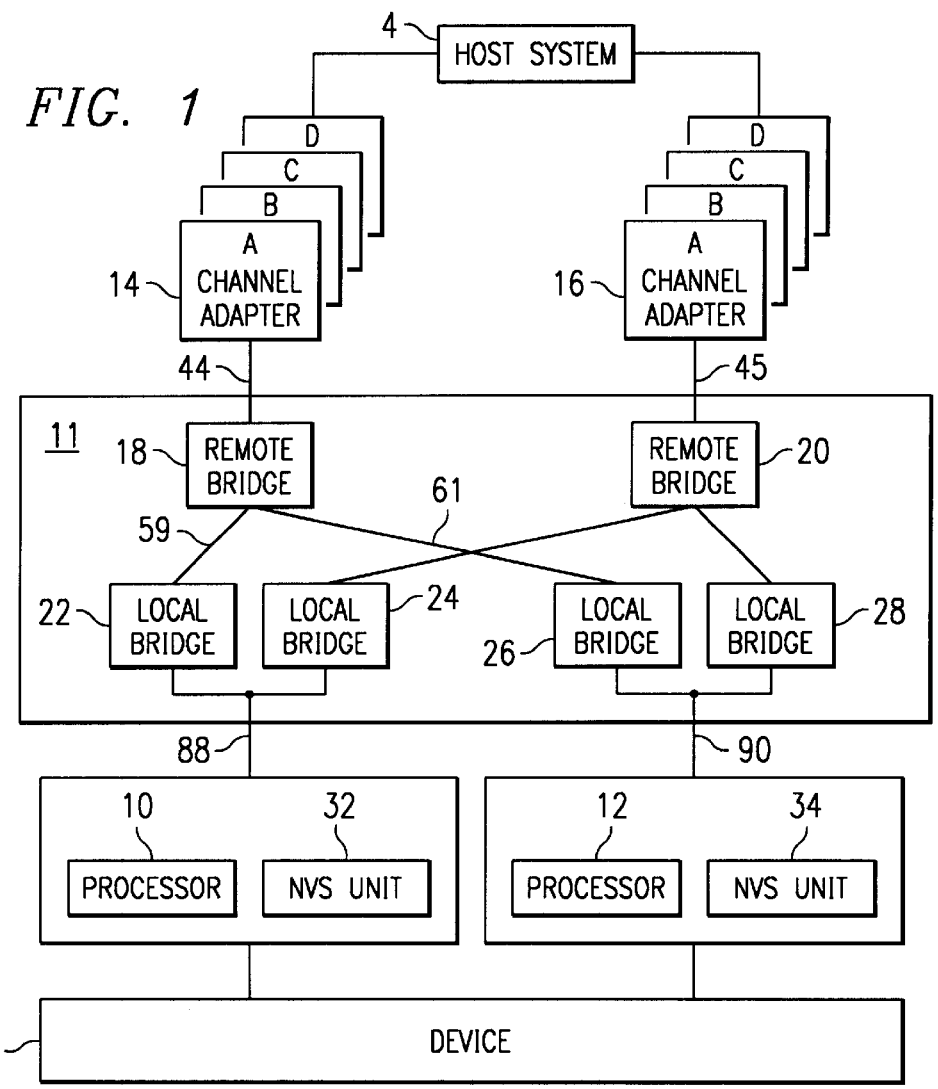
FIG. 1 is a block diagram of a PCI bus system in accordance with an embodiment of the present invention and attached host systems and devices.

Referring to FIG. 1, a PCI bus system 11 is illustrated in accordance with an embodiment of the present invention which provides communication paths, for example, between one or more host systems 4 and devices such as processors 10, 12, a device 6, and NVS (non-volatile store) units 32, 34. The exemplary PCI bus system 11 is based upon that illustrated in the incorporated '610 application, employing similar components, modified in accordance with the present invention. As discussed in the incorporated '610 application, the device 6 may comprise a direct access storage device subsystem, such as a string of DASDs.

The PCI bus system 11 allows the host systems 4 to communicate with the processor 10, 12, employing adapters 14A, B, C and D, 16A, B, C and D or other communication agents (not shown), including any device that typically communicates over a PCI bus. The channel adapters 14, 16 may comprise channel adapter cards that are each connected via a slot on the PCI bus system to a remote bridge 18, 20 of the PCI bus system 11. Each channel adapter card provides a connection to one or more host systems 4 at a secondary PCI bus 44, 45. Briefly, processor 10 controls a primary PCI bus 88, and processor 12 controls a primary PCI bus 90, each providing addresses for access by the adapters 14, 16 at secondary PCI busses 44, 45.

Two remote bridges 18, 20 may be provided coupled to different sets of channel adapters or other communication agents, and each remote bridge is coupled to local bridges. Thus, remote bridge 18 is coupled to local bridges 22, 26, and remote bridge is coupled to local bridges 24, 28. In the instant example, the local bridges 22, 24 may communicate with processor 10 and NVS unit 32 on primary PCI bus 88, and the local bridges 26, 28 may communicate with processor 12 and NVS unit 34 on primary PCI bus 90, although other arrangements may be envisioned by those of skill in the art. Thus, in the present example of a PCI bus system, the adapters 14A–D coupled to remote bridge 18 may communicate with the processors 10, 12 or NVS unit 32, 34 over the PCI bus system 11.

An important communication in a PCI bus system is the writing of data by a host system 4 at the NVS units 32, 34 and at a device 6, the data stored in the selected unit or device under the control of the processor 10, 12. Host systems typically deal with and process large amounts of data and require prompt access to, or storage of, that data to allow the host systems to continue processing without substantial wait times. Therefore, low latency of the bus system is required for such prompt access or storage. The Peripheral Component Interconnect (PCI) bus system is a high-performance expansion bus architecture which offers such a low latency path employing PCI bridges through which a host processor may directly access PCI devices.

In a multiple host environment, a PCI bus system may include such functions as data buffering and PCI central functions such as arbitration over usage of the bus system. As the result, the PCI bus systems become increasingly complex.

The data to be stored is typically customer data which will be retrieved at a subsequent time. It is of the utmost importance to the customer that the customer data not be lost or compromised. Thus, in addition to fast data storage, there must be some assurance that customer data has been transmitted across the PCI bus system error free. Hence, most channel adapters for the hosts require that a longitudinal redundancy check be made of the data transferred across a PCI bus to provide verification that the data transfer write operations have completed successfully and the data is correct.

In PCI bus systems, the channel adapters 14, 16 perform PCI write commands at the secondary PCI bus to transfer data to their destinations, and the remote bridge to which the data is transferred across the secondary bus conducts the redundancy calculation to insure that the data was transferred correctly. The remainder of the redundancy calculation is checked subsequent to the completion of the transfer of all of the data. In PCI bus systems, a read cannot pass a write. Thus, a write will have passed the remote bridge where the redundancy is calculated before a following read reaches the bridge. Hence, in the prior art, the channel adapter provided a PCI read command to the remote bridge attached to the secondary bus for reading the remainder from the calculation to indicate whether the data was transferred successfully and is correct.

Figure 2:
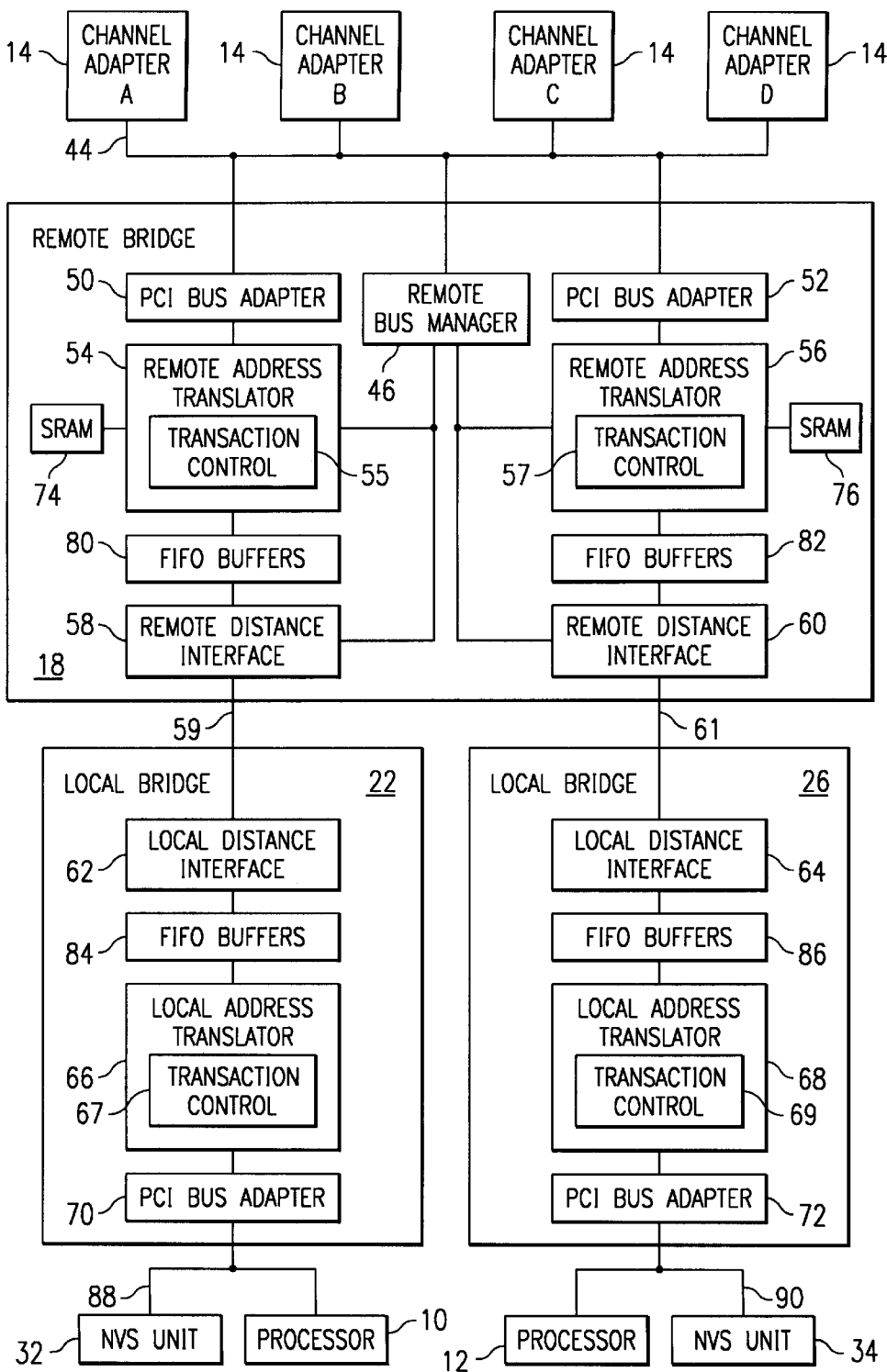
FIG. 2 is a block diagram of the PCI bus system of FIG. 1, illustrating a PCI remote bridge and two PCI local bridges.

Referring additionally to FIG. 2, further detail of one-half of the exemplary complex PCI bridge system of FIG. 1 is illustrated. As discussed in the incorporated '610 application, complex PCI systems employ arbitration between commands from the attached channel adapters on the secondary PCI bus to manage the usage of the bus system in an efficient manner. In the example of FIG. 2, the arbitration is conducted by a bus manager 46. Typically, the PCI bus manager 46 grants the commands from the channel adapters 14A–D on secondary PCI bus 44 in a round-robin fashion. An element of PCI architecture is that PCI read commands are extremely slow operations to complete, especially in complex PCI bus systems with multiple hosts and with multiple PCI bridges between the channel adapters and the storage devices, and the requesting adapter holds onto the bridge so as to provide a return path. Thus, in the prior art, the channel adapter sending the read command to determine if the transferred data was correctly transferred must pause, and all other users of the PCI bus are blocked and are stalled while the requester waits for the read to complete and indicate whether the data is correct, and only then can the other channel adapters conduct another operation.

The exemplary PCI bus system of FIG. 2 includes the PCI bus manager 46 which manages data and signals presented on the secondary PCI bus 44. The PCI bus manager 46 comprises bus central resource functions, which include circuitry that manages the bus arbitration discussed above, bus parking, and other bus management functions, preferably with standalone circuitry. The bus manager 46 has information describing the address ranges of the agents attached to the remote bridge 18, the PCI bus adapters 50 and 52, and other elements of the remote bridge, and uses this information to determine which agent or element is targeted by a PCI operation. The information on the address ranges was provided at initialization and is preferably written to registers in the bus manager 46, and may be copied to the PCI bus adapters. The remote bridge 18 also comprises remote address translators 54, 56, transaction controls 55, 57, remote distance interfaces 58, 60, and static random access memories (SRAM) 74, 76, or any other suitable memory devices. The PCI bus adapter 50, remote address translator 54, transaction control 55, and remote distance interface 58 provide communication between channel adapters 14 and local bridge 22. The PCI bus adapter 52, remote address translator 56, transaction control 57, and remote distance interface 60 provide communication between channel adapters 14 and local bridge 26. The channel adapters 14A, B, C, D communicate with either PCI bus adapter 50 or 52 via the secondary PCI bus 44. The PCI bus adapters 50, 52, remote address translators 54, 56, transaction control 55, 57, remote distance interfaces 58, 60 and SRAMs 74, 76 may comprise logical elements of PCI bridges as are known in the art or any other suitable type of bridge circuitry. The remote 58, 60 and local 62, 64 distance interfaces include controls and buffers known in the art to control transactions between the remote bridge 18 and the local bridges 22, 26 and provide for long distance communication therebetween over long distance connections 59, 61. The remote bridge 20 of FIG. 1 may be the same or similar to the remote bridge 18, and provides communication with the local bridges 24, 28.

Each local bridge 22, 26 comprises, respectively, a local distance interface 62, 64, a local address translator 66, 68, a transaction control 67, 69, and a PCI bus adapter 70, 72.

The remote 54, 56 and local 66, 68 address translators include circuitry known in the art to map a received address to another address space. Remote address translators 54, 56 perform address translation operations by mapping an address provided by channel adapters 14 to the address space of the local PCI bus adapters 70, 72, respectively. Local address translators 66, 68 map an address from the local PCI bus adapters 70, 72 to the remote PCI bus adapter 50, 52 address space, such that this translated address is transmitted to the remote address translator 54, 56 via the local 62, 64 and remote 58, 60 distance interfaces. In such case, the remote address translator 54, 56 may buffer and transmit this received address to the remote PCI bus adapters 50, 52. Similarly, after remote address translator 54, 56 translates an address received from the remote PCI bus adapter 50, 52 to the address space of the local PCI bus adapter 70, 72, respectively, this translated address is transmitted to the local address translator 66, 68 via the remote 58, 60 and local 62, 64 distance interfaces. In such case, the local address translator 66, 68 may buffer and transmit this received address to the local PCI bus adapter 70, 72.

Typically, the transaction control 55, 57 comprises redundancy calculation logic which conducts the LRC calculation with respect to data transferred across the secondary PCI bus, and stores the remainder of the calculation in a space in the SRAM 74, 76. The location of the space of the SRAM is specifically assigned to the agent attached to the secondary bus at initiation, as is understood by those of skill in the art. As each block of the data is transferred, the check value is calculated and updated with any previously calculated check value in the same space in the SRAM, e.g., a 32 bit space. Typically, the remainder stored as the result of the calculation with respect to the total amount of the data is zero, if the transfer was correct. Hence, upon completion of the data transfer across the secondary PCI bus, the channel adapter, in the prior art, provided a read command to read the remainder in the assigned space of the SRAM. If the remainder was non-zero, the channel adapter indicated that there was an error.

The FIFO buffer sections 80, 82, 84, and 86 queue the read/write transactions in the PCI bus system 11. Each of the FIFO buffer sections comprises multiple FIFO buffers to queue the transaction from the channel adapters 14A, B, C, D and other agents attached to the secondary bus. In the incorporated '610 application, each FIFO buffer is divided into sections, and separate sections are allocated to each adapter 14A–D for write and for read operations. Also, each adapter, processor, and element in the PCI bus system is assigned one or more "windows", comprising a predetermined range of addresses. The address translators 54, 56, 66, and 68 include transaction control circuitry 55, 57, 67, and 69 that includes logic to select queues in the FIFO buffers 80, 82, 84, and 86 to place a transaction and manage the flow of transactions. The FIFO buffers insure that the write commands are kept in sequence as they progress through the PCI bus system 11 at each of the FIFO buffers, thereby allowing the host system 4 to multiplex its operations.

The PCI busses 44, 88 and 90 are designed for only very short distances, measured substantially in inches, and small loads, and the distance connections 59, 61 are designed for longer distances with greater loads.

The prior art read command for reading the redundancy calculation remainder is processed by the PCI bus adapter 50, 52 in accordance with the arbitration of the remote bus manager 46, and provided to the remote address translator 54, 56 and its transaction control 55, 57, which reads the remainder from the mapped location of the SRAM 74, 76. Then, the transaction control forwards the remainder of the mapped location to the PCI us adapter 50, 52 and to the channel adapter 14, again under the control of the arbitration of the remote bus manager 46.

In a PCI bus system, only the PCI data source that is the originator of the data is able to identify that the transfer has been completed, and only that PCI data source can provide an indication that the redundancy value can be checked for an error.

The present invention provides a system for promptly determining the redundancy check value for write data completely transferred across a PCI interface and signaling the presence of any error.

Specifically, the present invention provides for a subsequently sent redundancy write command from, e.g., the channel adapter sending the data, to the transaction control 55, 57 to check the redundancy check value for the write data. Further, if the redundancy check value indicates an error, e.g., the value is non-zero, the transaction control 55, 57 will signal the error to an error handling system.

Figure 3:
FIG. 3 is a bit chart representation of a PCI bus "write-"command type employed by the present invention.
Figure 4:
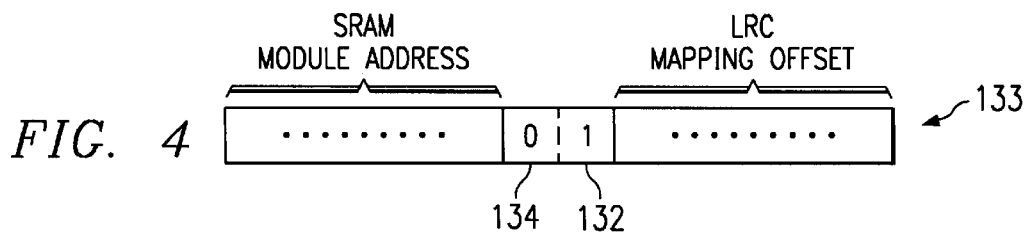
FIG. 4 is a bit chart representation of an embodiment of a PCI bus address identifying a special redundancy check write command in accordance with the present invention.

The bit pattern of a PCI bus write command 130 is illustrated in FIG. 3. The subsequently sent write command has an unique identifier, and is sent subsequent to completion of the transfer of the write data across the PCI bus. One embodiment of an unique identifier is illustrated in FIG. 4, and comprises a bit 132 in the address 133 of the PCI bus write command 130. The bit 132 is unused for the SRAM address decode range, and is what would otherwise be an address of a larger SRAM. As an alternative, two bits 134 and 132 may be used to provide an encoded unique identifier. The address 133, except for bits 132 and 134, preferably comprises the window addressing the SRAM module together with the address of the specific storage location assigned to the agent supplying the command, which is the same address as used with respect to the prior art read command for reading the LRC remainder.

Referring to FIGS. 1–4, in accordance with the present invention, data path logic of the remote transaction control 55, 57 responds to the unique identifier 132 of the write command 130, 133, detecting the updated calculated check value at the storage location of the SRAM 74, 76. Error check logic coupled to the data path logic determines whether the detected updated calculated check value indicates an error, and upon the detected updated calculated check value indicating an error, the remote transaction control signals the error to an error system, or generates an interrupt to the originating channel adapter.

An example of a transaction control 55 having logic in accordance with the present invention is illustrated in FIG. 5. If a received command is a normal write command, redundancy calculation logic, comprising redundancy calculator 310, calculates the check value for the block of data accompanying the write command, and stores the remainder in the location of the SRAM mapped to the PCI data source. The data of the write command is transferred into the assigned one of the FIFO buffers 80 of FIG. 2 and to the local bus 22, 26. Subsequently received data blocks of the same write command and address are added to the FIFO buffers, and the check value calculated by the redundancy calculator 310 which updates the calculated check value with any previously calculated check value, e.g., by reading the previously calculated check value from the SRAM location, determining the new remainder, and sending the new remainder for storage in the same location of the SRAM. Other arrangements for calculating the check value and updating each calculated check value with any previously calculated check value may be employed as is known to those of skill in the art.

Referring to FIGS. 2–5, in accordance with the present invention, the subsequently sent redundancy write command 130, 133, having the unique identifier bit 132, or bits 132, 134, is received over the PCI bus interface. The subsequently sent redundancy write command may be sent from any non-originating agent which requests the notification of any erroneous transfer of the data, but that requesting agent must have received an indication from the originating agent that transferred the data, that the transfer is complete. Preferably, the requesting agent that originated the subsequently sent redundancy write command is also the agent that originated the data and transferred the data across the PCI bus interface, e.g., an adapter 14.

The subsequently sent redundancy write command will address the SRAM location 74 mapped to the normal write command calculated check value, and additionally has the unique identifier. A key detector 305 senses the unique identifier of the subsequently sent redundancy write command, the key detector operates a SRAM arbiter 306 to insure that no data is written regarding any signals on the bus that appear to be data accompanying the redundancy write command during the data phase. Instead, the key detector 305 operates the SRAM to provide the check value remainder addressed by the subsequently sent redundancy write command, from the SRAM 74 to error check logic comprising a compare 323. In the typical redundancy check logic, an all zero value of the remainder indicates that the checked data is error free. Thus, compare 323 compares the remainder from the SRAM addressed location to an all zero value.

In one alternative, if the remainder is an all zero value, no signal is sent back to the originator of the subsequently sent redundancy write command, and the originator will send a write command as described in copending U.S. patent application No. (TU999073) which passes the remote bridge and provides an echo write back to the originator. The originator will rely on the lack of an error indication before receipt of the returning echo write. Also, the echo write could additionally perform the redundancy write command, with the return echo write providing the value of the remainder back to the originating agent. If the remainder is a non-zero value, error signaling logic 325 signals the error to an error handling system on bus 326. As is known to those of skill in the art, an error handling system will halt operation of the remote bridge and save all the information so that the source of the error may be determined.

In either embodiment, in the event that there is an all zero remainder as indicated by compare 323, error signaling logic 325 may provide a non-error signal, which is sent to the address of the originator.

The transaction control 57 of FIG. 2 is preferably identical or similarly arranged to the transaction control 55 discussed above.

Thus, the present invention promptly determines the redundancy check value for write data completely transferred across a PCI interface and signals the presence of any error.

An embodiment of the method of the present invention is illustrated in FIG. 6. Referring additionally to FIGS. 2–5, the originating PCI data source sends a write command in step 400 to transfer data to a PCI data destination. The originator provides the data to be transferred by block, either continuously or separately. In step 410, the originator determines whether all of the data has been sent. If not, the next block is sent, and, in step 403, the remote bridge 18 and the appropriate transaction control 55, 57 receive the data block. In step 405, the redundancy calculator 310 calculates a check value for the block of data, updating the calculated check value with any previously calculated check value, and, in step 407, stores the check value in the mapped location of SRAM 74, 76. The data block is transferred to the assigned FIFO buffers 80, 82, in step 408.

As the originator sends additional blocks of data, steps 403–408 are repeated for each block, such that the check value in SRAM 74, 76 is continually updated by employing, in step 405, the previous remainder stored in step 407, and all of the data is transferred to the FIFO buffers 80, 82 in step 408.

Upon the originator completing the data transfer, as indicated by step 410, the originator, in step 412, sends the subsequently sent redundancy write command.

In step 415, the appropriate transaction control 55, 57 receives the subsequently sent redundancy write command, and, in step 416, the key detector 305 decodes the unique identifier of the subsequently sent write command. The key detector 305 responds to the command and, in step 417, first operates SRAM arbiter 306 to prevent any signals inadvertently on the bus at the data phase of the command from being written to the storage location or used for the redundancy calculator, and, second, in step 420, accesses the remainder check value from the addressed location in the SRAM 74, 76. The remainder is provided to the compare logic 323 which compares the check value to the desired all zeros value in step 422. If the comparison indicates that the remainder is all zeros such that there is no error, in step 425, the error signaling logic 325, in step 426, does nothing, or, posts an OK to the originator of the subsequently sent write command if required as discussed above. There is no need to clear the addressed location in the SRAM since it is already all zeros or "null". Doing nothing in step 426, allows the echo write to provide the indication that the data was transferred without error.

If the error check compare logic 323 indicates a non-zero result and an error in step 425, the error signaling logic 325 signals an error in step 428 to the error system on bus 326. The error handling system will save all of the information, including the non-zero remainder, so that the source of the error may be determined.

Those of skill in the art may modify the specific elements of the transaction control 55, 57 and the specific steps of FIG. 6 while adhering to the present invention.

Thus, the present invention provides a method and system for promptly determining the redundancy check value for write data completely transferred across a PCI interface, and for signaling any error in the data transfer.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a PCI bus system having at least one PCI bus, at least one PCI data source, and at least one PCI data destination, a method for checking errors in write data transferred from said one PCI data source across said PCI bus to said PCI bus system for said at least one PCI data destination, said write data comprising a data stream of a plurality of blocks, comprising the steps of:

across said PCI bus from said at least one PCI data source, calculating a check value for each said block of said data stream transferred across said PCI bus;

updating any previously calculated check value for said data stream with said calculated check value at a storage location, said storage location across said PCI bus from said at least one PCI data source;

responding to an unique identifier of a redundancy write command sent subsequent to completion of said transfer of said write data across said PCI bus, checking said updated calculated check value at said storage location for an error indication; and upon said checking step indicating an error, signaling said error.

2. The method of claim 1, wherein said write command unique identifier comprises at least one bit of a PCI address of said subsequently sent redundancy write command, said at least one bit unused in the decode range of said PCI address, and wherein said checking step additionally comprises responding to said at least one bit of said PCI address to check said updated calculated check value.

3. The method of claim 2, wherein said checking step additionally comprises signaling said error to an error handling system.

4. The method of claim 2, wherein said PCI bus system has a plurality of said PCI data sources, wherein said updating step additionally updates said calculated check value at said storage location additionally identified by an association with said PCI data source, and wherein said subsequently sent redundancy write command additionally is addressed to said identified storage location.

5. The method of claim 1, wherein said checking step additionally comprises preventing any write at said storage location by said write command.

6. In a PCI bus system having at least one PCI bus, at least one PCI data source, and at least one PCI data destination, a system for checking errors in write data transferred from said one PCI data source across said PCI bus to said PCI bus system for said at least one PCI data destination, said write data comprising a data stream of a plurality of blocks, comprising:

a storage memory;

redundancy calculation logic coupled to said PCI bus and to said storage memory, receiving said write data across said PCI bus from said at least one PCI data source, calculating a check value for each said block of said data stream transferred across said PCI bus, and updating any previously calculated check value for said data stream with said calculated check value at a storage location of said storage memory;

data path logic coupled to said PCI bus and to said storage memory, responding to an unique identifier of a redundancy write command sent subsequent to completion of said transfer of said write data across said PCI bus, detecting said updated calculated check value at said storage location of said storage memory; and error check logic coupled to said data path logic determining whether said detected updated calculated check value indicates an error, and upon said detected updated calculated check value indicating an error, signaling said error.

7. The error checking system of claim 6, wherein said write command unique identifier comprises at least one bit of a PCI address of said subsequently sent redundancy write command, said at least one bit unused in the decode range of said PCI address, and wherein said data path logic additionally comprises a key detector for sensing said at least one bit of said PCI address and for identifying said subsequently sent redundancy write command.

8. The error checking system of claim 7, wherein said error check logic signals said error to an error handling system.

9. The error checking system of claim 7, wherein said PCI bus system has a plurality of said PCI data sources, wherein said redundancy calculation logic updates said calculated check value at said storage location of said storage memory additionally identified by an association with said PCI data source, and wherein said subsequently sent redundancy write command additionally is addressed to said identified storage location.

10. The error checking system of claim 6, wherein said data path logic additionally prevents any write at said storage location by said write command.

11. A PCI bus system for transferring write data from at least one PCI data source to at least one PCI data destination, and for checking errors in write data transferred from said one PCI data source to said PCI bus system for said at least one PCI data destination, said write data comprising a data stream of a plurality of blocks, comprising:

a PCI bus coupled to said at least one PCI data source;

a storage memory;

redundancy calculation logic coupled to said PCI bus and to said storage memory, receiving said write data across said PCI bus from said at least one PCI data source, calculating a check value for each said block of said data stream transferred across said PCI bus, and updating any previously calculated check value for said data stream with said calculated check value at a storage location of said storage memory;

data path logic coupled to said PCI bus and to said storage memory, responding to an unique identifier of a redundancy write command sent subsequent to completion of said transfer of said write data across said PCI bus, detecting said updated calculated check value at said storage location of said storage memory; and error check logic coupled to said data path logic determining whether said detected updated calculated check value indicates an error, and upon said detected updated calculated check value indicating an error, signaling said error.

12. The PCI bus system of claim 11, wherein said write command unique identifier comprises at least one bit of a PCI address of said subsequently sent redundancy write command, said at least one bit unused in the decode range of said PCI address, and wherein said data path logic additionally comprises a key detector for sensing said at least one bit of said PCI address and for identifying said subsequently sent redundancy write command.

13. The PCI bus system of claim 12, wherein said error check logic signals said error to an error handling system.

14. The PCI bus system of claim 12, wherein said PCI bus system has a plurality of said PCI data sources, wherein said redundancy calculation logic updates said calculated check value at said storage location of said storage memory additionally identified by an association with said PCI data source, and wherein said subsequently sent redundancy write command additionally is addressed to said identified storage location.

15. The PCI bus system of claim 11, wherein said data path logic additionally prevents any write at said storage location by said write command.

* * * * *

UNITED STATES PATENT AND TRADEMARK OFFICE
CERTIFICATE OF CORRECTION

PATENT NO.      : 6,530,043 B1                                               Page 1 of 1
DATED           : March 4, 2003
INVENTOR(S)     : Beardsley et al.

It is certified that error appears in the above-identified patent and that said Letters Patent is hereby corrected as shown below:

<u>Column 1,</u>
Line 3, insert the following:
-- DOCUMENTS INCORPORATED BY REFERENCE
Commonly assigned US Patent Application No. 09/275,610 is incorporated for its showing of a PCI bus bridge system for processing requests from multiple attached agents.

FIELD OF THE INVENTION
This invention relates to redundancy checking of write data, and, more particularly to the redundancy checking of write data transferred across a PCI bus. --

Signed and Sealed this

Twenty-fourth Day of June, 2003

JAMES E. ROGAN
*Director of the United States Patent and Trademark Office*